United States Patent Office 3,284,486
Patented Nov. 8, 1966

3,284,486
PROCESS FOR THE PRODUCTION OF
PYRETHRIC ACID
Masanao Matsui and Yasuhiro Yamada, Tokyo, Japan,
assignors to Sumitomo Chemical Company, Ltd.,
Osaka, Japan, a corporation of Japan
No Drawing. Filed May 21, 1963, Ser. No. 282,147
Claims priority, application Japan, May 25, 1962,
37/21,494, 37/21,495, 37/21,496
8 Claims. (Cl. 260—468)

The present invention relates to a process for the production of pyrethric acid (Formula Ia), which is the acidic moiety of pyrethrin-II (Formula IIa) and cinerin-II (Formula IIb), effective insecticidal components of pyrethrum flower.

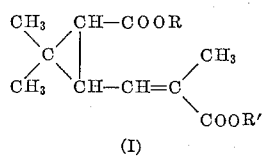

(I)

(a) R=—H and R'=—CH$_3$
(b) R=R'=—H
(c) R=R'=—CH$_3$
(d) R=—CH$_3$ and R'=—H
(e) R=—C(CH$_3$)$_3$ and R'=—CH$_3$
(f) R=—C(CH$_3$)$_3$ and R'=—H

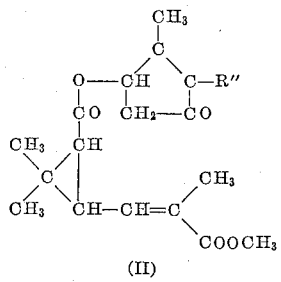

(II)

(a) R''=—CH$_2$—CH=CH—CH=CH$_2$
(b) R''=CH$_2$—CH=CH—CH$_3$

In the syntheses of pyrethrin-II, cinerin-II and other synthetic analogs, pyrethric acid is an important material. So far, pyrethric acid in pure state has not yet been synthesized. Pyrethric acid has been produced heretofore by converting chrysanthemum dicarboxylic acid (Formula Ib) to its dimethyl ester, which is then partially saponified to convert one of the methoxycarbonyl radicals to carboxyl radical. The pyrethric acid thus produced, however, contains another monomethyl ester (Formula Id) in a considerable amount. The contamination of such monomethyl ester (Formula Id) is undesirable, since it does not yield effective compounds when esterified with the alcohol moiety of the pyrethrum component or its analogs. Furthermore, it is difficult to remove such ester (Formula Id) from pyrethric acid afterward.

The present inventors have found a novel process consisting of a combination of steps, by which pure pyrethric acid, even in crystalilne form, can be produced.

Accordingly, an object of the present invention is to provide a process for producing pyrethric acid in pure state, freed from the undesirable isomer. Other objects and advantages would be apparent from the following description.

The process of the invention consists of a combination of a series of steps starting from tert.-butyl chrysanthemum monocarboxylate (Formula III), which may be shown according to the following equation.

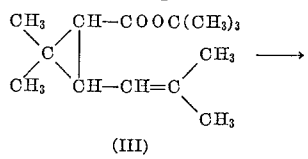

(III)

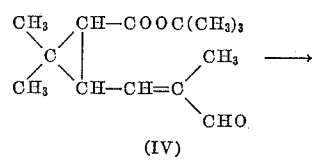

(IV)

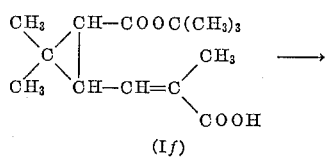

(If)

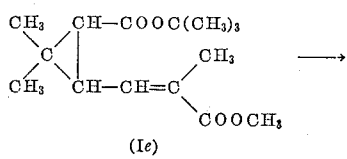

(Ie)

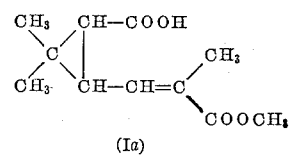

(Ia)

Thus, the present invention provides a process for the production of pyrethric acid, which comprises a series of sequential steps of oxidizing tert.-butyl chrysanthemum monocarboxylate (III) with an oxidizing agent to form tert.-butyl 2,2-dimethyl-3-(2'-formyl-1'-propenyl)cyclopropanecarboxylate (IV), oxidizing the resulting tert.-butyl 2,2-dimethyl-3-(2'-formyl-1'-propenyl)cyclopropanecarboxylate with an oxidizing agent to form 2-methyl-3-(2',2'-dimethyl-3'-tert.-butoxycarbonylcyclopropyl) acrylic acid (If), methylating the resulting 2-methyl-3-(2',2'-dimethyl-3'-tert.-butoxycarbonylcyclopropyl) acrylic acid with a methylating agent to form tert.-butyl pyrethrate (Ie), and deisobutenating the resulting tert.-butyl pyrethrate by heating to form pyrethric acid (Ia).

The first step of the process of the present invention is an oxidation of tert.-butyl chrysanthemum monocarboxylate (III) to tert.-butyl 2,2-dimethyl-3-(2'-formyl-1'-propenyl)cyclopropanecarboxylate (IV). The reaction condition of this step is any of the conventional methods which are known for the oxidation of terminal methyl radical adjacent to an ethylenically unsaturated linkage to convert it to formyl radical. For example, the oxidation reaction may be effected with an oxidizing agent such as selenium dioxide and selenious acid. Ordinarily, tert.-butyl chrysanthemum monocarboxylate, preferably in a solvent inert to the oxidation reaction, such as dioxane, lower alcohols, benzene, toluene, xylene, and tetrahydrofuran, is heated at a temperature of from about 60° to 150° C., or higher for several hours. After the reaction is completed, selenium is filtered off, and the objective tert.-butyl 2,2-dimethyl-3-(2'-formyl-1'-propenyl)cyclopropanecarboxylate is recovered from the filtrate.

The second step of the process of the present invention is oxidation of tert.-butyl 2,2-dimethyl-3-(2'-formyl-1'-propenyl)cyclopropanecarboxylate (IV) to 2-methyl-3-(2',2'-dimethyl - 3' - tert. - butoxycarbonylcyclopropyl) acrylic acid (If). The reaction condition of this step is any of the conventional methods which are known for the oxidation of formyl radical to carboxyl radical. For example, the above-mentioned formyl compound (IV) may be oxidized with silver oxide in an alkaline condition, or with oxygen or an oxygen containing gas such as air, preferably in the presence of an oxidizing catalyst such as a copper salt. When the oxidation is effected with silver oxide in an alkaline condition, attention should be paid for the prevention of hydrolysis of the tert.-butyl ester group. Accordingly, the oxidation should be carried out at a moderate temperature with a comparatively short period of time of contacting of the material and the product with alkali.

The third step of the process of the present invention is methylation of 2-methyl-3-(2',2'-dimethyl-3'-tert.-butoxycarbonylcyclopropyl)acrylic acid (If) to tert.-butyl pyrethrate (Ie). Any of the conventional methylating conditions may be employed. The preferable methods are that using diazomethane and that using dimethyl sulfate in an alkaline condition. The conditions for these methods would be obvious to those skilled in the art.

The fourth step of the process of the invention is deisobutenation of tert.-butyl pyrethrate (Ie) to pyrethric acid (Ia). The tert.-butoxycarbonyl radical is converted to free carboxyl radical by heating through splitting isobutene off. Thus, tert.-butyl pyrethrate is heated at a temperature of 200° to 280° C., preferably 260° to 270° C., until vigorous generation of isobutene is over. If desired, it is heated in a medium which is inert to the starting material, as well as the product, and is liquid at the heating temperature. The preferable medium involves diphenyl, diphenyl ether, benzophenone, diphenylmethane, anthracene, and phenanthrene.

As described above, the process of the invention consists of a series of sequential steps starting from tert.-butyl chrysanthemum monocarboxylate to produce pyrethric acid which is freed from the undesirable isomeric acid. Accordingly, a feature of the invention resides in the utilization of the characteristic of the tert.-butyl ester in the oxidation of chrysanthemum monocarboxylic acid to the dicarboxylic acid. Besides, the intermediate compounds, i.e. tert.-butyl 2,2-dimethyl-3-(2'-formyl-1'-propenyl)cyclopropanecarboxylate (IV), 2-methyl-3-(2',2'-dimethyl - 3'-tert.-butoxycarbonylcyclopropyl)acrylic acid (If), and tert.-butyl prethrate, are novel compounds unknown in the literatures.

In the process of the present invention, each step may be started from any of cis- or trans-compound, or a mixture thereof to yield the cis- or trans-product, or a mixture thereof, respectively. Moreover, the starting material may be any of (+)-, (−)- or (±)-compound to yield respective (+)-, (−)- or (±)-product. If desired, optical resolution may be conducted at any intermediate stage. Among the isomers of pyrethric acid, trans-isomer is more effective when esterified with the alcohol moiety of the pyrethrum component or its analogs. As to optical active isomers, (+)-trans-pyrethric acid is the most effective, and is the same as the acidic moiety of the natural pyrethrum constituent.

Heretofore, (±)-trans-pyrethric acid in crystalline form has not yet been obtained, since the acid prepared according to the known process includes a comparatively large amount of the isomeric acid (Id). As shown in the following example, the process of the invention may yield crystalline (±)-trans-pyrethric acid.

Now, the process of the invention will be more fully described with reference to the following examples, which are, however, set forth merely by way of illustration and not by way of limitation.

*Example 1*

A mixture of tert.-butyl 214 g. of (±)-trans-chrysanthemum monocarboxylate (B.P. 110°–120° C./15 mm., $n_D^{27}$ 1.4559) and 112 g. of selenium dioxide in 800 ml. of dioxane was refluxed for one hour. The mixture was cooled, and selenium was isolated and filtered off. After evaporation of dioxane, the residue was distilled in vacuo. Tert.-butyl (±)-trans-2,2-dimethyl-3-(2'-formyl-1'-propenyl)cyclopropanecarboxylate was obtained in 89 g. yield, B.P. 120°–130° C./1 mm., M.P. 81° C. (from petroleum benzene, B.P. 45°–80° C.).

*Analysis.*—Found: C, 70.38; H, 9.24%. Calcd. for $C_{14}H_{22}O_3$: C, 70.55; H, 9.31%.

*Example 2*

Fifty five grams portion of tert.-butyl (±)-trans-2,2-dimethyl - 3 - (2' - formyl - 1' - propenyl)cyclopropanecarboxylate was dissolved into 150 ml. of carbon tetrachloride. To the resulting solution was added 0.5 g. of copper salt of ethyl acetoacetate. The solution was well shaken in dry oxygen atmosphere (or in dry air, if desired) at room temperature for 24 hours, whereby the butyl ester was oxidized. The solution was then heated at 40° to 50° C. in vacuo to remove carbon tetrachloride, and 100 ml. of ethyl ether was added to the residue. The ether solution was extracted 4 times with each extraction using 150 ml. of 4% aqueous sodium hydroxide solution, and the combined extract was acidified with a dilute hydrochloric acid. The crystals thus isolated were filtered by suction. The objective product, weighing 20.3 g., was recrystallized from ethyl ether. The resulting (±)-trans-2 - methyl - 3 - (2'2' - dimethyl - 3' - tert.-butoxycarbonylcyclopropyl) acrylic acid had M.P. 128° C., with the following analytical results.

Found: C, 65.96; H, 8.76%. Calcd. as $C_{14}H_{22}O_4$. C, 66.11; H, 8,72%.

The neutral portion recovered from the ether solution was the starting material, weighing 33 g.

*Example 3*

The neutral portion recevered from the ether solution 3 - 3' - formyl - 1'-propenyl)cyclopropanecarboxylate was mixed with 100 ml. of 3% aqueous sodium hydroxide solution. The mixture was added with silver oxide freshly prepared from 13 g. of silver nitrate, and heated at 60° C. for 1 hour, while being stirred. The aqueous layer was withdrawn by means of a pipette, and 100 cc. of 3% aqueous sodium hydroxide solution were added. After heating at 60° C. for 30 minutes under stirring, the aqueous layer was again withdrawn. Another 100 ml. of 3% aqueous sodium hydroxide solution were added, and the mixture was treated similarly. Thereafter, silver was filtered off and the filtrate was combined with the aqueous layers withdrawn during the reaction. The mixture was acidified with a dilute hydrochloric acid, and extracted with ethyl ether. The ether solution was washed with water, and then dried. Upon evaporation of the ether, the objective acid was obtained, weighing 1.1 g. The recovered neutral portion was the starting material, weighing 1.5 g.

*Example 4*

A solution of 9 g. of (±)-trans-2-methyl-3-(2',2'-dimethyl - 3' - tert.-butoxycarbonylcyclopropyl)acrylic acid (M.P. 128°C.) in ethyl ether was added with an ethyl ether solution of diazomethane prepared from 8 g. of nitrosomethylurea. After vigorous gas generation ceased, acetic acid was added to the solution to decompose the excess of diazomethane. The ether solution was washed with aqueous sodium bicarbonate solution to remove the acidic substance, washed with water and then dried. Upon removal of ehtyl ether, 9 g. of the objective product were obtained. It can be distilled at 128°–134° C./0.5 mm., $n_D^{18}$ 1.4750.

Example 5

Into a solution of 5 g. of (±)-trans-2-methyl-3-(2′,2′-dimethyl-3′-tert.-butoxycarbonylcyclopropyl)acrylic acid in 50 ml. of methanol, there were added a solution of 3 g. of dimethyl sulfate in 10 ml. of methanol and a solution of 1 g. of sodium hydroxide in 10 ml. of water concurrently from two separate dropping funnels while stirring. The adding velocities were so adjusted that the additions of the both solutions were finished at the same time. After stirring for an additional 1 hour, 100 ml. of water were added thereto, and the mixture was extracted with 300 ml. of ethyl ether. The ether solution was washed with water. After evaporation of ethyl ether, the residue was distilled at B.P. 120°–125° C./0.3 mm. The product weighed 4.3 g.

Example 6

Nine grams of tert.-butyl (±)-trans-pyrethrate were heated at 260° to 270° C. for 20 minutes in an oil bath. The reaction product, after cooling, was dissolved in ethyl ether, and the solution was extracted with an aqueous sodium bicarbonate solution to separate the acid portion. The aqueous extract was acidified with a dilute hydrochloric acid, and the isolated oily substance was extracted with ethyl ether. The ether extract was washed with water and dride. Upon evaporation of ethyl ether, 3.5 g. of (±)-trans-pyrethric acid were obtained. It had an M.P.84° C. after recrystallization from ethyl ether or petroleum ether. This is the first time that (±)-trans-pyrethric acid is obtained in crystalline form.

*Analysis.*—Found: C, 62.14; H, 1.98%. Calcd. as $C_{11}H_{16}O_4$: C, 62.25; H, 7.60%. Similarly 9 g. of tert.-butyl (±)trans-pyrethrate were mixed with 25 g. of diphenyl and the mixture was treated in the same way as mentioned above. (±)-Trans-pyrethric acid was obtained in 5.2 g. yield.

Example 7

The procedure of Example 6 was repeated, using tert.-butyl (+)-trans-pyrethrate instead of tert-butyl (±)-trans-pyrethrate. (+)-Trans-pyrethric acid (same as the one naturally originated) was obtained in almost similar yield, M.P. 69° C., $[\alpha]_D^{22} = +101°$ (C.=0.373 in carbon tetrachloride).

What we claim is:

1. A process for the production of pyrethric acid, comprising heating tert.-butyl pyrethrate at a temperature of about 200–280° C. for de-isobutenation to yield pyrethric acid.

2. A process for the production of pyrethric acid, comprising methylating 2-methyl-3-(2′,2′-dimethyl-3′-tert.-butoxycarbonylcyclopropyl)acrylic acid with a methylating agent to yield tert.-butyl pyrethrate and deisobutenating the resulting tert.-butyl pyrethrate by heating to a temperature sufficient to drive off isobutene to yield pyrethric acid.

3. A process for the production of pyrethric acid, comprising oxidizing tert.-butyl 2,2-dimethyl-3-(2′-formyl-1′-propenyl)cyclopropanecarboxylate to yield 2-methyl-3-(2′-2′-dimethyl-3′-tert.-butoxycarbonylcyclopropyl)acrylic acid, methylating the resulting 2-methyl-3-(2′,2′-dimethyl-3′-tert.-butoxycarbonylcyclopropyl)acrylic acid with a methylating agent to yield tert.-butyl pyrethrate, and deisobutenating the resulting tert.-butyl pyrethrate by heating to a temperature sufficient to drive off isobutene to yield pyrethric acid.

4. A process for producing pyrethric acid, comprising oxidizing tert.-butyl chrysanthemum monocarboxylate to yield tert.-butyl 2,2-dimethyl-3-(2′-formyl-1′-propenyl)cycloproyanecarboxylate, oxidizing the resulting tert.-butyl 2,2-dimethyl-3-(2′-formyl-1′-propenyl)cyclopropanecarboxylate to yield 2-methyl-3-(2′,2′-dimethyl-3′-tert.-butoxycarbonylcyclopropyl)acrylic acid, methylating the resulting 2-methyl-3-(2′,2′-dimethyl-3′-tert.-butoxycarbonylcyclopropyl)acrylic acid with a methylating agent to yield tert.-butyl pyrethrate, and deisobutenating the resulting tert.-butyl pyrethrate by heating to a temperature sufficient to drive off isobutene to yield pyrethric acid.

5. A process according to claim 3, wherein the temperature during deisobutenation is about 200 to 280° C.

6. A process according to claim 4, wherein the last mentioned oxidation step is carried out employing an oxidizing agent selected from the group consisting of selenium dioxide and selenious acid.

7. A process according to claim 6, wherein the tert.-butyl 2,2-dimethyl-3-(2′-formyl-1′-propenyl)cyclopropanecarboxylate is oxidized in the presence of silver oxide in an alkaline medium.

8. A process according to claim 6, wherein the tert.-butyl 2,2-dimethyl-3-(2′-formyl-1′-propenyl)cyclopropanecarboxylate is oxidized in the presence of an oxygen containing gas and a copper salt.

References Cited by the Examiner

UNITED STATES PATENTS

| | | | |
|---|---|---|---|
| 3,009,946 | 11/1961 | Takei et al. | 260—468 |
| 3,077,496 | 2/1963 | Julia | 260—468 |

OTHER REFERENCES

Crombie et al.: "J. Chem. Soc. (London)" (1957), pp. 2743–2754.

LORRAINE A. WEINBERGER, *Primary Examiner.*

RICHARD K. JACKSON, *Assistant Examiner.*